(No Model.)  W. FRASER.  2 Sheets—Sheet 1.
WAGON BRAKE.
No. 601,872.  Patented Apr. 5, 1898.
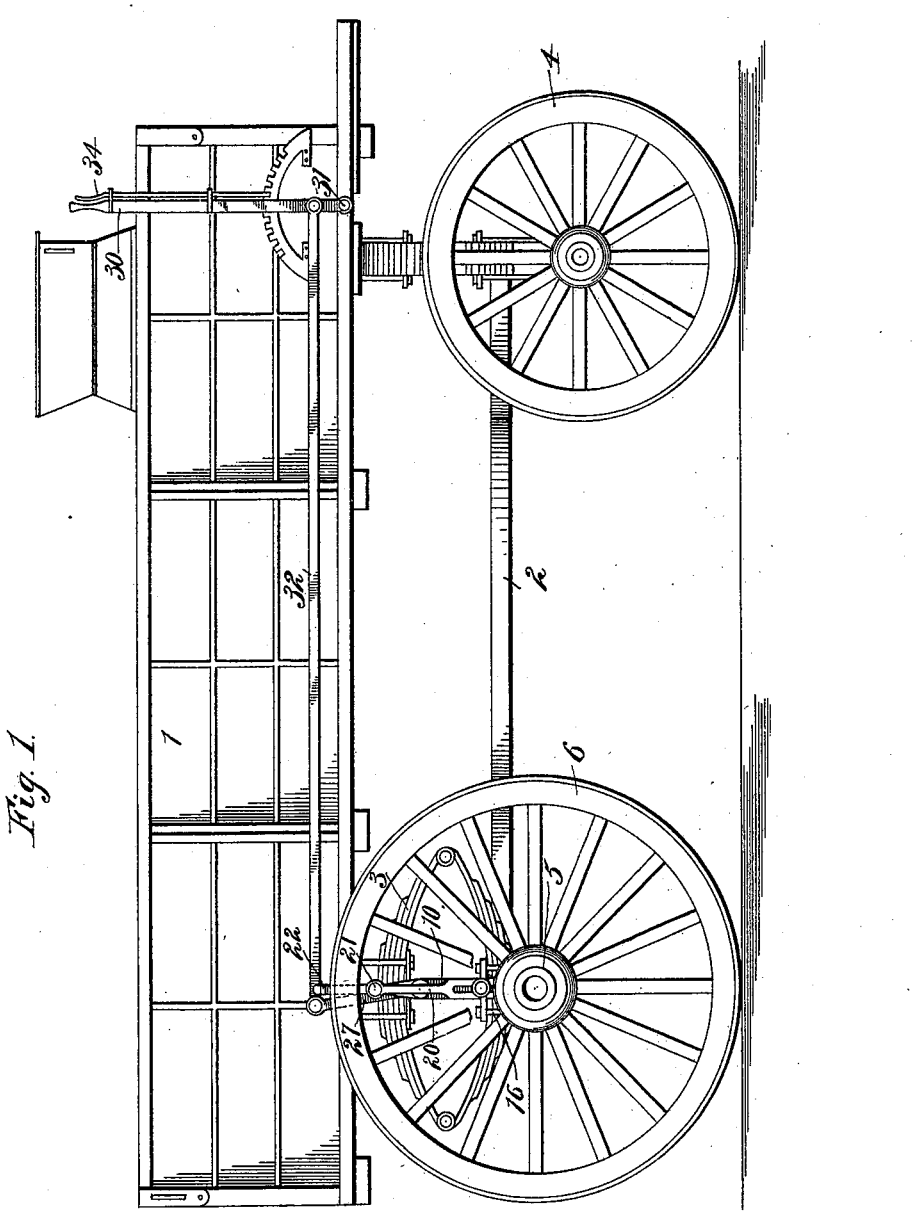
WITNESSES,  INVENTOR
  William Fraser
BY
  ATTORNEY

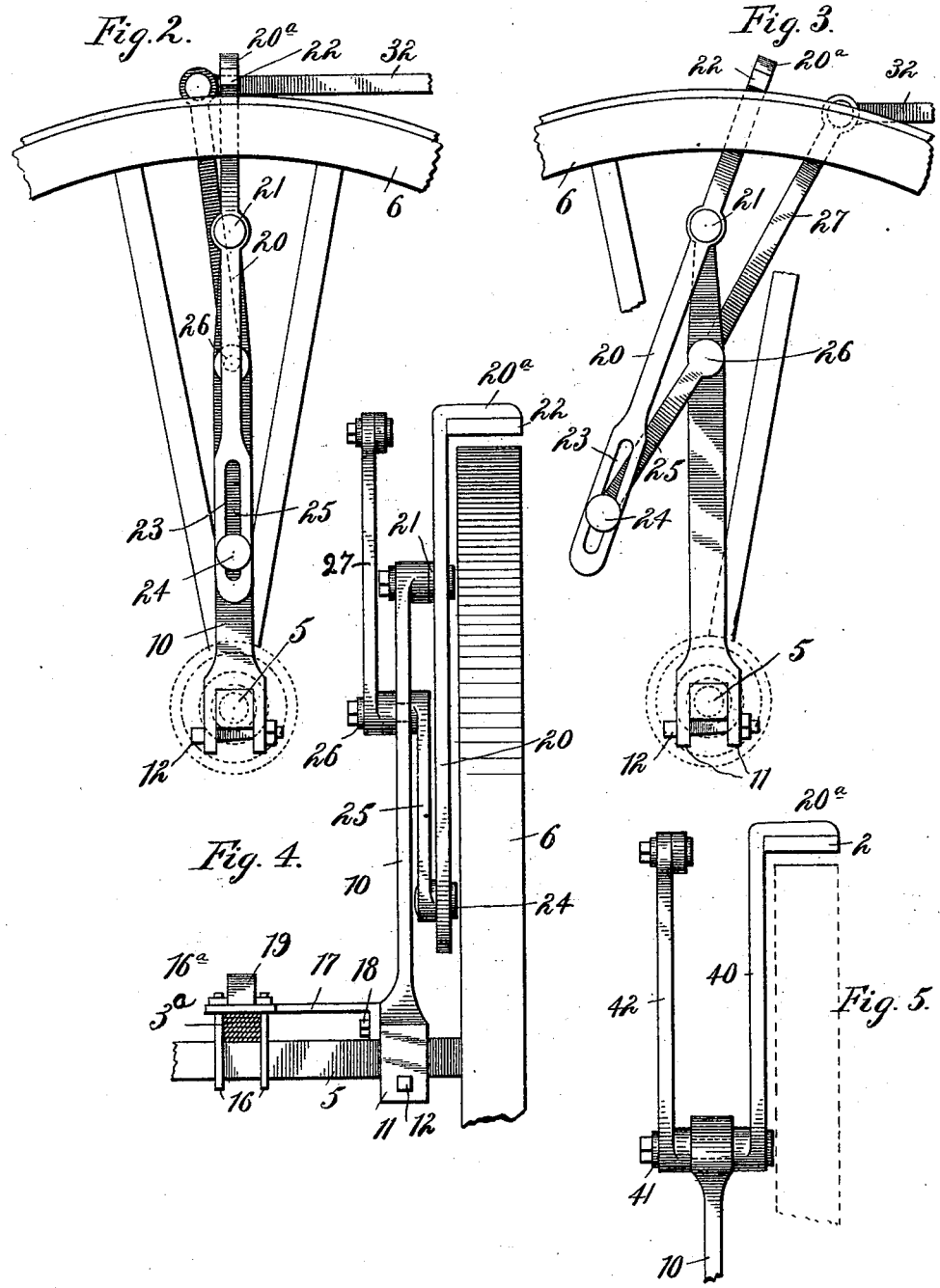

UNITED STATES PATENT OFFICE.

WILLIAM FRASER, OF DOBBS FERRY, NEW YORK.

WAGON-BRAKE.

SPECIFICATION forming part of Letters Patent No. 601,872, dated April 5, 1898.

Application filed November 2, 1897. Serial No. 657,150. (No model.)

*To all whom it may concern:*

Be it known that I, WILLIAM FRASER, a citizen of the United States, residing at Dobbs Ferry, in the county of Westchester and State of New York, have invented certain new and useful Improvements in Wagon-Brakes, of which the following specification, taken in connection with the accompanying drawings, forming part thereof, is a full, clear, and exact description, such as will enable those skilled in the art to make and use the same.

My invention relates to improvements in chock or lock brakes which are particularly applicable to heavy wagons.

Heavy wagons are now most commonly equipped with friction-brakes which are caused to be firmly pressed against the tires of the wheels for retarding the rotation of the wheels without positively arresting their motion. To properly check the speed of a heavy wagon descending a hill with such friction-brakes, it is necessary to apply the brakes with a great deal of pressure, and unless the driver be a strong man it is sometimes impossible to control the wagon. Furthermore, friction-brakes have not proven perfectly satisfactory, because they are usually mounted upon the bodies of the wagons which are supported upon the springs of the running-gear, so that the brake-shoes will assume different positions with relation to the tires of the wheels when the wagon is heavily loaded and when the wagon is unloaded. It has also been proposed to provide wagons with chock or lock brakes, but for certain reasons, probably because no satisfactory form of chock-brake has yet been devised, this form of brake has not gone into general use.

It is the purpose of my present invention to produce an improved form of chock or lock brake which will be perfectly strong and reliable for securely locking the wheel of a heavy wagon against rotation when descending a hill, and which can easily be thrown on and off at the will of the driver for accomplishing this object.

To accomplish my object, I mount a heavy standard or bracket rigidly upon the rear axle of the wheel and pivot to said bracket or standard a brake-lever carrying a suitable brake-shoe, said brake-lever being suitably connected through the proper connecting links and levers with the hand-lever of the brake.

The operating mechanism of the brake-lever is preferably in the form of a long bell-crank lever journaled in the bracket or standard and engaging the lower end of the brake-lever at one end and having the connecting-rod of the hand-lever connected to it at its other end. The bracket or standard may be secured to the axle in any suitable manner, but is preferably bifurcated to straddle the axle and braced against sidewise displacement by a brace which is attached to the bracket and the clips which secure the wagon-springs to the axle.

In order that my invention may be fully understood, I will first describe the same with reference to the accompanying drawings, and afterward point out the novelty with more particularity in the annexed claims.

In said drawings, Figure 1 is a side elevation of a wagon equipped with my improved chock-brake. Fig. 2 is an enlarged detail side elevation of the braking mechanism, showing a portion of a wagon-wheel and the brake in disengaged position. Fig. 3 is a similar view showing the brake in applied position. Fig. 4 is a detail end elevation of the parts shown in Fig. 2. Fig. 5 is a detail end elevation of a slight modification.

1 is a wagon-body; 2, the running-gear thereof; 3, the rear springs; 4, the front wheels, and 6 the rear wheels, journaled upon the axle 5. Mounted upon the axle 5, just inside the hub of the rear wheel 6, is a heavy bracket or standard 10, formed with a bifurcated lower end 11, straddling the axle.

12 is a wedge passing through suitable openings in the bifurcations of the standard or bracket 10 and engaging the under side of the axle 5 for rigidly locking the standard 10 in upright position upon the axle.

3ª in Fig. 4 represents the lower part of one of the heavy rear springs of the wagon, secured to the axle 5 by the clip-bolts 16.

17 is a brace-plate secured at 18 to the standard 10 and having its other end secured by the clamp-plate 16ª of the clips 16.

19 is the usual rubber cushion.

20 is the braking-lever, journaled at a point between its ends upon a bolt 21 in the upper end of the standard or bracket 10 remote from the axle. The braking-lever has an outwardly-bent portion 20ª at its upper end, to which is secured the brake-shoe 22. The lower end of the brake-lever 20 has an elongated slot 23, in which operates a pin 24, (preferably carrying an antifriction-roll,) secured to the lower end of a rock-arm 25, keyed to and projecting downwardly from a short rock-shaft 26, which extends through and is journaled in the standard 10.

27 is a rock-arm keyed to the opposite end of short rock-shaft 26 and extending upwardly therefrom or in an opposite direction from the rock-arm 25.

30 is a hand-lever of the brake journaled at 31 to the vehicle-body 1, and 32 is a connecting-rod connecting the hand-lever 30 to the upper end of the rock-arm 27.

33 is the segment-rack concentric with pivot 31, and 34 is the spring-actuated hand-controlled detent device mounted on the hand-lever 30 and engaging rack 33 for holding the hand-lever against motion in either direction.

It will be observed that the brake-lever 20 is journaled at a point remote from the journal of the vehicle-wheel, and hence when said brake-lever is rocked upon its pivot the brake-shoe will be moved into engagement with the tire of the wheel. This is accomplished by the operation of the hand-lever 30, and it will be clear that when the brake-shoe is thrown into engagement with the wheel the tendency of the wheel is to lock the shoe tightly into engagement, which will effectually chock or lock the wheel against rotation. The brake-shoe can be locked into engagement with the wheel to prevent forward motion of the vehicle when descending a hill, causing the wheels to skid down the hill, or by a reverse movement of the hand-lever it can be locked into engagement with the wheel to prevent rearward motion of the vehicle in such cases—for instance, as when the vehicle has stopped part way up the hill and it is desired to prevent the retrograde motion of the vehicle while the horses are given a rest.

In Fig. 5 I have shown a slight modification of my invention, which, however, is inferior to the preferred form above described. In this form the brake-lever 40 is keyed to a rock-shaft 41, journaled in the upper end of standard 10, and has an operating-lever 42, keyed to and extending upwardly from it and connected with the connecting-rod 32. This form of the device may prove satisfactory when applied to light wagons; but it will not suffice for heavy wagons, as the proper leverage could not be obtained for throwing the brake off.

I have shown my improved brake applied to but one side of a wagon; but it is quite obvious that it can readily be applied to both sides without departing from the spirit of my invention.

Having thus described my invention, the following is what I claim as new therein and desire to secure by Letters Patent:

1. In a chock or lock brake, the combination of a vehicle-axle, a bracket or standard rigidly mounted upon said axle and extending upwardly therefrom, a brake-lever journaled upon said bracket or standard and carrying a brake-shoe, and suitable hand-controlled operating means adapted to throw the brake-lever forward or backward and lock the brake-shoe against the wheel in either position to prevent rotation either backward or forward, as set forth.

2. The combination, in a lock-brake, of a vehicle-axle, a bracket or standard rigidly mounted upon the axle, a brake-lever journaled upon said bracket or standard and carrying a brake-shoe, said brake-lever being constructed and arranged to move the brake-shoe into two braking positions from a normal central inoperative position, and suitable operating means connected with the brake-lever and adapted to throw the brake-lever to one side or the other of the central inoperative position and lock the brake-shoe against the wheel in either of the braking positions to prevent rotation either backward or forward, as set forth.

3. The combination, in a brake, of the vehicle-axle, a bracket or standard rigidly mounted upon the axle, a brake-lever journaled upon the bracket or standard and adapted to move the brake-shoe into two braking positions from a normal central inoperative position, a brake shoe or block carried by the brake-lever in position to engage the rim of the wheel, and suitable operating mechanism constructed to hold the braking-lever normally in central inoperative position and throw said lever forward or backward and lock the brake-shoe against the wheel in either of the braking positions to prevent rotation either backward or forward, substantially as set forth.

4. In a chock or lock brake, the combination of a vehicle-axle, a bracket or standard rigidly mounted upon the axle, a brake-lever journaled at a point between its ends upon the bracket or standard, a brake-shoe mounted upon the brake-lever upon one side of its journal, and operating mechanism engaging said brake-lever upon the opposite side of its journal, substantially as set forth.

5. The combination, in a chock or lock brake, of a vehicle-axle, a bracket or standard rigidly mounted upon the axle, a brake-lever journaled at a point between its ends upon said bracket or standard, a brake-block mounted upon one end of the brake-lever, an operating rock-lever journaled upon the bracket or standard and engaging the brake-lever at or adjacent to the end farthest away from the brake-block, and a hand operating device controlling said operating rock-lever, as set forth.

6. The combination in a chock or lock brake, of the vehicle-axle, a bracket or standard secured to the axle, a brake-lever carrying a brake-shoe at one end and formed with an elongated slot at the other end, a rock-shaft journaled in the bracket or standard, a rock-arm keyed to one end of said rock-shaft and engaging the slot in the brake-lever, a rock-arm keyed to the other end of said rock-shaft and operatively connected with a hand-lever, as set forth.

7. In a brake, the combination of an axle, a bracket or standard mounted upon the axle, a spring secured to the axle by suitable clips, a brace-plate attached to the bracket or standard and secured to the axle by the clips, a brake-lever journaled upon the bracket or standard, and suitable operating means, as set forth.

WILLIAM FRASER.

Witnesses:
 LOUIS BAEPPLER,
 G. R. WERRBACH.